(12) United States Patent
Colas et al.

(10) Patent No.: US 6,863,221 B2
(45) Date of Patent: Mar. 8, 2005

(54) LINEAR PROPORTIONAL VALVE

(75) Inventors: Alex Colas, Bolton (CA); Michel A. Beaulne, Toronto (CA); Ronald G. Stark, Oakville (CA)

(73) Assignee: Tesma International Inc., Concord (CA)

( * ) Notice: Subject to any disclaimer, the term of this patent is extended or adjusted under 35 U.S.C. 154(b) by 0 days.

(21) Appl. No.: 10/458,122

(22) Filed: Jun. 10, 2003

(65) Prior Publication Data

US 2004/0108387 A1 Jun. 10, 2004

Related U.S. Application Data

(60) Provisional application No. 60/432,366, filed on Dec. 10, 2002.

(51) Int. Cl.[7] .................................................. F01P 7/14
(52) U.S. Cl. ................................. 236/34.5; 236/DIG. 2
(58) Field of Search ...................... 236/34, 34.5, DIG. 2

(56) References Cited

U.S. PATENT DOCUMENTS

| | | | | |
|---|---|---|---|---|
| 4,679,530 A | * | 7/1987 | Kuze ......................... | 123/41.1 |
| 4,848,652 A | * | 7/1989 | Kennedy .................... | 236/34.5 |
| 6,343,746 B2 | * | 2/2002 | Chamot et al. ............ | 236/34.5 |
| 6,695,217 B2 | * | 2/2004 | Leu et al. .................. | 236/34.5 |
| 2003/0136357 A1 | * | 7/2003 | Kobayashi et al. ...... | 123/41.08 |

* cited by examiner

Primary Examiner—William E. Tapolcai
(74) Attorney, Agent, or Firm—Clark Hill PLC (57) ABSTRACT

A valve assembly for automatically and proportionally controlling the flow of coolant fluid between an engine and a radiator for cooling the fluid heated by the engine in response to changes in the fluid temperature within a predetermined temperature range. The valve assembly includes a housing having a fluid chamber extending between opposing first and second ends. A radiator port extends between the radiator and the first end of the chamber. A bypass port extends between the engine outlet and the chamber. An engine port extends between the engine inlet and the chamber. A main valve is slidably received within the chamber for movement in and out of engagement with the first end of the chamber for closing and opening fluid flow between the radiator and the chamber. A secondary valve is slidably received within the chamber for movement with the main valve in and out of engagement with the first end of the chamber for opening and closing fluid flow between the bypass port and the chamber. A drive assembly is operatively coupled between the secondary valve and a central control for automatically and proportionally opening and closing the main and secondary valves in response to changes in the fluid temperature within a preselected temperature range.

23 Claims, 5 Drawing Sheets

LINEAR PROPORTIONAL VALVE

RELATED APPLICATION

This application claims priority to and all the benefits of U.S. Provisional Patent Application No. 60/432,366, filed on Dec. 10, 2002.

BACKGROUND OF THE INVENTION

1. Field of the Invention

The invention relates to a valve for regulating coolant temperatures of a combustion engine for an automotive vehicle.

2. Description of the Prior Art

Internal combustion engines for automotive vehicles generate heat from the combustion of fuel and friction between the many moving components within the engine, such as between the engine block and the pistons. An engine-driven impeller propels coolant fluid between flow paths formed within the engine block and a heat sink or radiator exposed to ambient airflow passing over the surface of the radiator for carrying the heat away from the engine block. Hoses are typically used to carry coolant fluid between the engine block and the radiator.

Typically, a wax valve or thermostat is coupled between the engine block and the radiator to control the flow of coolant fluid from the engine block to the radiator. Below a predetermined temperature, the thermostat is closed to restrict coolant fluid flow from the engine block to the radiator, which expedites warming of the engine. Above the predetermined temperature, a wax element within the thermostat expands proportionally in response to the rising coolant fluid temperature to mechanically engage and open a valve within the thermostat to allow coolant fluid to flow from the engine block to the radiator. In the radiator, the coolant fluid from the engine is cooled by heat exchange with ambient airflow passing over the surface of the radiator. The cooled coolant fluid passes from the radiator to the engine block and the coolant fluid is again heated by the combustion cycle and friction generated within the engine. The valve is spring biased closed so that within a range of temperatures around the predetermined temperature, the valve opening varies in size roughly in proportion to the coolant fluid temperature. However, wax thermostats are generally slow to respond to engine block temperature and are susceptible to failure due to clogging by contaminates commonly born within the coolant fluid due to corrosion within the engine block and radiator.

It remains desirable to provide a thermostat or valve that can be actively opened and closed to allow or restrict the flow of coolant fluid between the engine block and radiator in response to a wider range of engine variables and states over conventional wax thermostats. Further, it remains desirable to provide a valve that is resistant to the contaminants in the coolant fluid.

SUMMARY OF THE INVENTION

A valve is provided for controlling the flow of coolant between an engine and a radiator in an automotive vehicle. The valve comprises a housing having a chamber formed therein extending between opposing first and second ends. A radiator port extends between the radiator and the first end of the chamber for passing coolant between the radiator and the chamber. A bypass port extends between an outlet from the engine and the chamber for passing coolant flowing between the engine and the chamber. An engine port extends between an inlet from the engine and the chamber for passing coolant flowing from one or both of the radiator or bypass ports between the inlet of the engine and the chamber. A main valve is slidably received within the housing for movement in and out of engagement with the first end of the chamber for closing and opening fluid flow between the radiator and the chamber. A secondary valve is slidably received within the housing for movement with the main valve in and out of engagement with the first end of the chamber for opening and closing fluid flow between the bypass port and the chamber. A drive assembly is operatively coupled between the secondary valve and a central control for automatically and proportionally opening and closing the main and secondary valves in response to changes in the temperature of the coolant within a predetermined temperature range.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
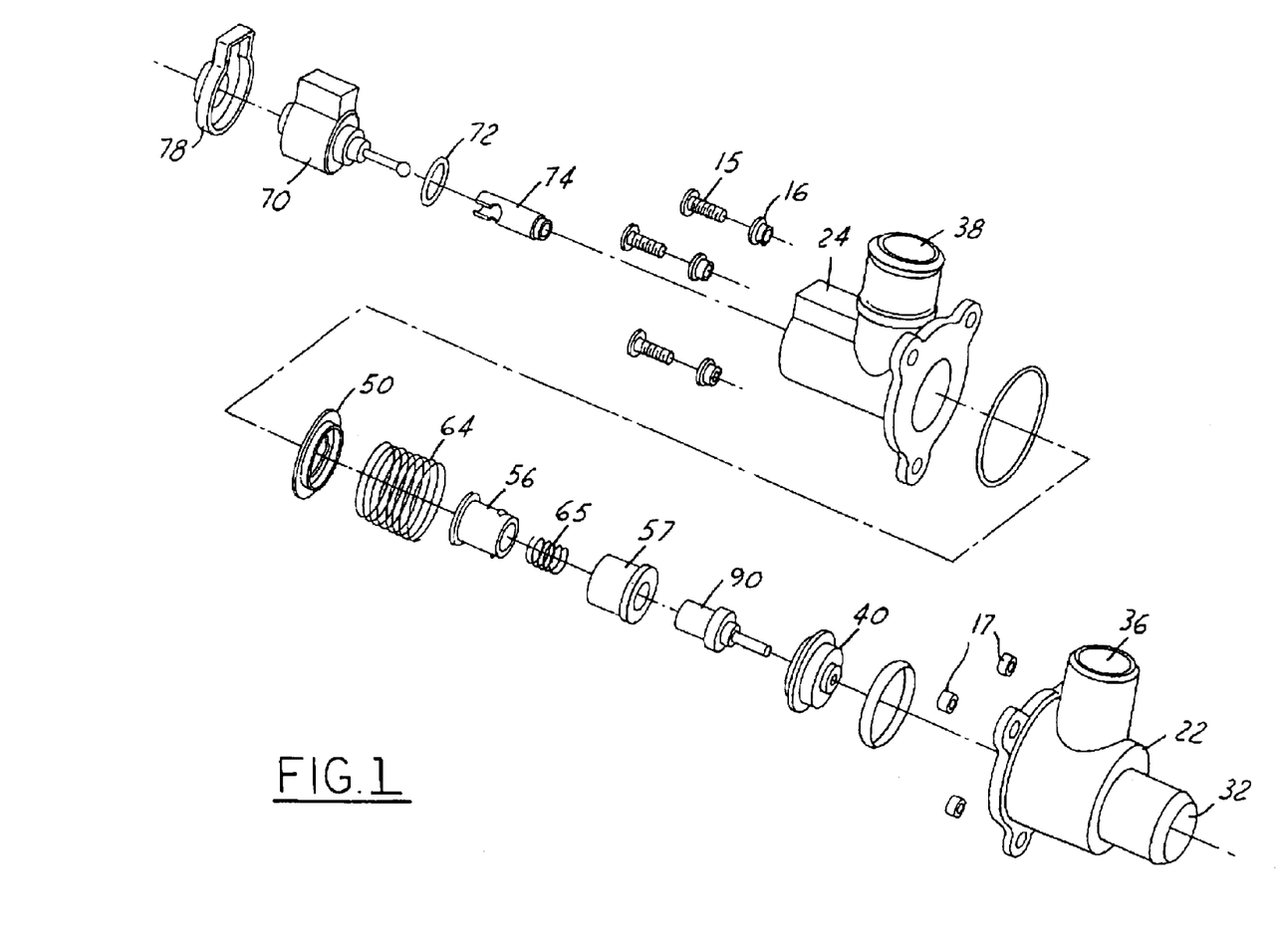
FIG. 1 is an exploded view of a first embodiment of a valve assembly according to the present invention.
Figure 2:
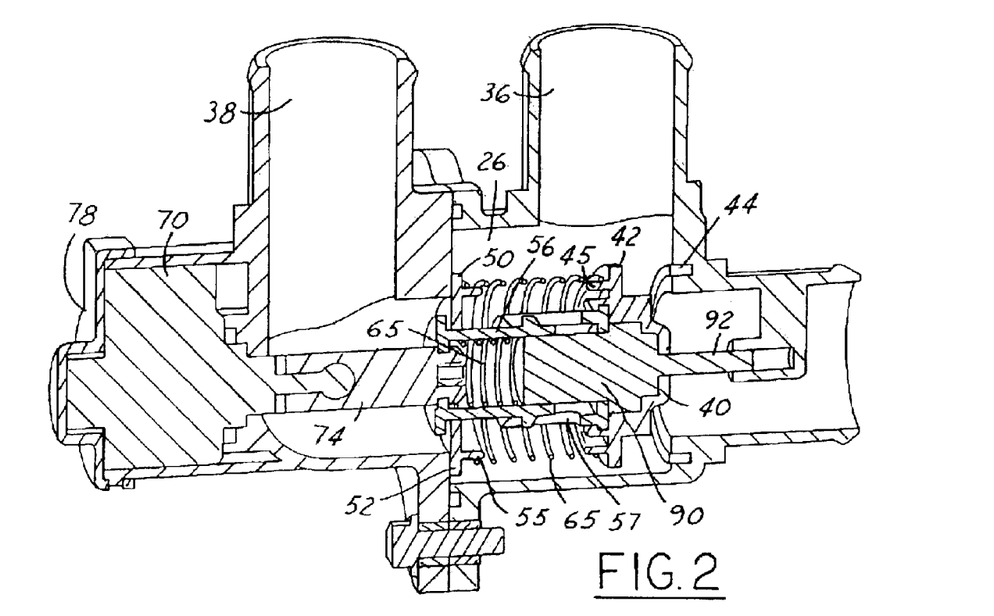
FIG. 2 is a partial cross sectional view of the valve assembly of FIG. 1 in the closed position.
Figure 3:
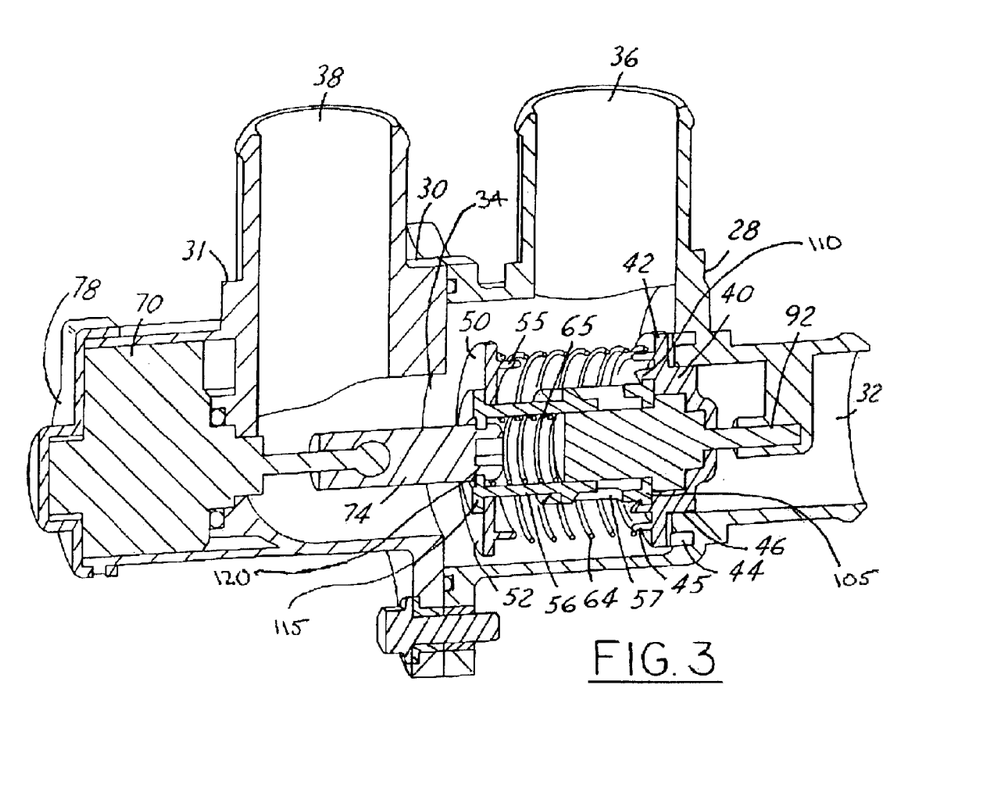
FIG. 3 is a partial cross sectional view of the valve assembly of FIG. 1 in the open position.

Referring to FIGS. 1–3, there is shown a first embodiment of a valve assembly 10 for controlling the flow of coolant fluid between an engine of an automotive vehicle and a radiator. The valve assembly 10 includes a housing 20 having lower and upper halves 22, 24 for operatively supporting the components of the valve assembly 10. The lower and upper halves 22, 24 may be welded together, or otherwise secured such as with bolts 15, load limiters 16 and threaded inserts 17 that are keyed into the lower housing 22, as shown in FIG. 1.

A generally cylindrical chamber 26 is formed between the lower and upper halves 22, 24 and extends between a first end wall 28 in the lower half 22 and a second end wall 30 in the upper half 24. A tubular-shaped inlet or radiator port 32 extends generally outwardly from the first end wall 28 of the chamber 26 for passing fluid flow from the radiator to the chamber 26. A bore 34 is formed in the first end wall 28 for allowing fluid flow between the radiator port 32 and the chamber 26. A tubular-shaped outlet or engine port 36 extends generally outwardly from between the first and second end walls 28, 30 of the chamber 26 for passing fluid flow from the chamber 26 to the engine. A tubular-shaped bypass inlet 38 extends generally outwardly from the chamber 26 between engine port 36 and a third end wall 31 in the upper housing 24 for passing fluid flow from the engine to the chamber 26.

A generally cylindrical main valve 40 is slidably received within the chamber 26 for axial movement in and out of abutting engagement with the first end wall 28 of the chamber 26. The main valve 40 includes an annular disc or first ring 42 that extends radially outwardly from the main valve 40 for axially abutting or seating against the first end wall 28. When the first ring 42 is seated against the first end wall 28, fluid flow between the radiator port 32 and the chamber 26 is prevented. An O-ring gasket 44 is mounted to the first end wall 28 for creating a seal between the first end wall 28 and the first ring 42.

The main valve 40 also includes a generally conical first guide 46 extending from the first ring 42 that is concentrically engagable with the bore 34 in the first end wall 28 for properly locating the first ring 42 against the first end wall 28 during axial movement of the main valve 40 towards and away from the first end wall 28. The main valve 40 also includes a first shoulder 45 extending longitudinally from the first ring 42 towards the second end wall 30. The first shoulder 45 mates with a spring 64, as will discussed in more detail below. The main valve 40 further includes a hollow central cavity for receiving a fail safe wax motor 90, again that will be discussed in more detail below.

The main valve 40 is coupled to a failsafe cover 57 that comprises a hollow cylindrical member 100 terminating at a flange 105 at an end corresponding to the first ring 42 of the main valve 40. The failsafe cover 57 attaches to the main valve 40 via a snap fit tab 110 formed on the main valve 40 that engages the flange 105 of the fail safe cover 57.

A generally cylindrical secondary valve 50 is slidably received within the chamber 26 for axial movement between the main valve 40 and the second end wall 30 of the chamber 26. The secondary valve 50 includes a second ring 52 extending radially from the second valve 50. The diameter of the second ring 52 preferably is smaller than the inner diameter of the chamber 26. The second ring engages the second end wall 30 for restricting fluid flow between the bypass inlet 38 and the engine port 36. The secondary valve 50 also includes a second shoulder 55 similar to the first shoulder 45 of the main valve 40 for receiving a spring 64.

The secondary valve 50 includes a central bore 54 through which a hollow valve body 56 extends toward the main valve 40. The hollow valve body 56 includes a radially extending flange 115 that has a diameter that is larger than the central bore 54 for locating the hollow valve body 56 relative to the second valve 50. The flange 115 includes a bore 120 formed centrally therein for allowing mating with a linear actuator 70, as will be discussed in more detail below. Disposed within the hollow valve body 56 is a failsafe spring 65, that engages the fail safe wax motor 90 outlined above and provides a biasing force that will be need to be exceeded by the motor 90 to operate the failsafe mechanism.

The hollow valve body 56 is coupled to the fail safe cover 57 of the main valve 40 by a snap fit connection. The cover 57 is attached to the main valve 40 in a similar snap fit type of connection, as outlined above. Inside the cover 57 is the failsafe wax motor 90, which reacts to an elevated temperature and opens fluid transfer should the drive assembly 70 fail. A helical-type spring biasing member 64 is seated along the first shoulder 45 of main valve 40 and the second shoulder 55 of the secondary valve 50 for axially biasing apart the main and secondary valves 40, 50, such that they move as a unit under normal operating conditions.

The secondary valve 50 includes a central bore 54 through which a hollow valve body 56 extends toward the main valve 40. The hollow valve body 56 includes a radially extending flange 115 that has a diameter that is larger than the central bore 54 for locating the hollow valve body 56 relative to the second valve 50. The flange 115 includes a bore 120 formed centrally therein for allowing mating with a linear actuator 70, as will be discussed in more detail below. Disposed within the hollow valve body 56 is a failsafe spring 65, that engages the fail safe wax motor 90 outlined above and provides a biasing force that will need to be exceeded by the motor 90 to operate the failsafe mechanism.

The position of the valves 40, 50 within the chamber 26 of the housing 20 is monitored by Hall Effect sensors (not shown) embedded within the driving motor (not shown). A central control receives and translates the signal output from the sensors in the motor into an axial position of the valves 40, 50 within the chamber 26, based on the predetermined amount of axial travel of the valves 40, 50 for every revolution of the motor windings. Fluid temperature is monitored by temperature sensors (not shown) located in the engine. Signals from the temperature sensors are received by the central control. The central control processes the positional and temperature information to provide the appropriate signal to the linear actuator 70 to open or close the valves 40, 50 accordingly.

In operation, the engine is started which begins the flow of coolant fluid through the engine. Until the engine warms to a predetermined temperature, the central control maintains the valves 40, 50 in the closed position, as shown in FIG. 2. In the closed position, the first ring 42 is seated against the gasket 44 to prevent fluid flow through the radiator. This creates a backpressure in the radiator, which prevents flow from the engine through the radiator. This backpressure eventually overcomes the biasing force of the member 64 and forces fluid to flow through the bypass inlet and chamber 26 and back into the engine. Thus, heat generated within the engine is generally held by the fluid. When the fluid temperature reaches a predetermined level or range, the central control sends a signal to the linear actuator 70 to move the valves 40, 50 back towards the end wall 30, to the open position, as shown in FIG. 3. In the open position, the first ring 42 is spaced apart from the gasket 44 to allow fluid flow from the radiator and through the radiator port 32 and chamber 26, thereby relieving back pressure between the engine and radiator. At the same time, the second ring 52 substantially limits or restricts flow from the engine and through the bypass inlet 38, which creates a back pressure in the fluid between the engine and bypass inlet 38. The back pressure between the engine and bypass inlet 38 forces the fluid to flow through the radiator where the fluid is cooled by heat exchange with ambient air flowing over the radiator. The cooled fluid enters the radiator port 32 and freely passes through the chamber 26 to the engine port 36. Since the gasket 44 axially faces the second end wall 30, the gasket 44 avoids direct fluid flow between the radiator and engine ports. By avoiding direct fluid flow, the gasket 44 is not exposed to abrasive contents such as dirt and debris contained within the cooling fluid thereby extending the service life of the gasket 44. The fluid leaves the engine port 36 and re-enters the engine where the fluid is re-heated by the combustion and friction within the engine. The heated fluid re-emerges from the engine to again be cooled by flow and heat exchange within the radiator. When the fluid temperature is cooled to a predetermined level or range, the central control sends a signal to the drive assembly 70 to move the valves 40, 50 to the closed position, as shown in FIG. 2. Within the predetermined temperature range, the position of the valves 40, 50 can be controllably varied by the central control between the open and closed positions in linear proportion to the temperature of the fluid. It should be appreciated that the central control can be adapted to open and close the valves 40, 50 in response to any preselected arrangement and type of sensors, such as sensors for fluid pressure or engine speed.

Disposed within the hollow valve body 56 is a failsafe spring 65, that engages the fail safe wax motor 90 outlined above and provides a biasing force that will be need to be exceeded by the motor 90 to operate the failsafe mechanism. Inside the cover 57 is the failsafe wax motor 90, which reacts to an elevated temperature and opens fluid transfer should the drive assembly 70 fail.

A failsafe for the drive assembly 70 or the central control loop in the form of a mechanical wax motor 90 extends between one end 92 fixedly secured within the hollow central cavity of the main valve 40 and an opposite end 94 slidably engaged with a short, cylindrical locator 96 formed in a portion of the radiator port 32 walls when the valves 40, 50 are in the closed position. During normal functioning of the drive assembly 70, the failsafe wax motor 90 moves with the valves 40, 50 between the closed and open positions. However, if either the drive assembly 70 or the central control fails while the valves 40, 50 are in the closed position, rising or falling temperature of the fluid will cause the failsafe wax motor 90 to expand or contract, respectively. Expansion or contraction of the failsafe wax motor 90 displaces the main valve 40 between the open position, as shown in 3, and the closed position, as shown in FIG. 2. The secondary valve 50 is held in the closed position by the failed drive assembly 70.

Disposed within the hollow valve body 56 is a failsafe spring 65, that engages the fail safe wax motor 90 outlined above and provides a biasing force that will be need to be exceeded by the motor 90 to operate the failsafe mechanism. Inside the cover 57 is the failsafe wax motor 90, which reacts to an elevated temperature and opens fluid transfer should the drive assembly 70 fail.

Figure 4:
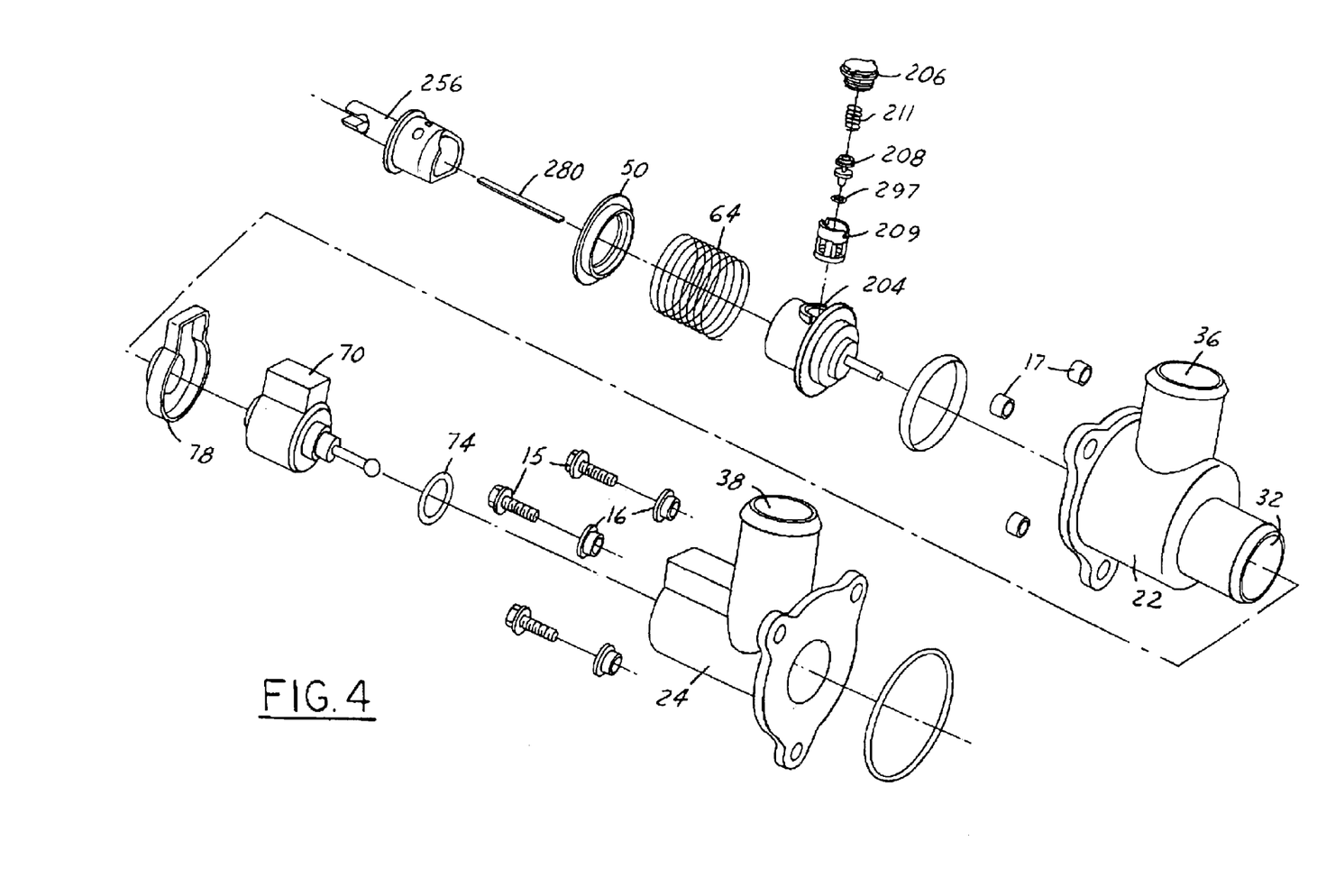
FIG. 4 an exploded view of a second embodiment of a valve assembly according to the present invention.
Figure 5:
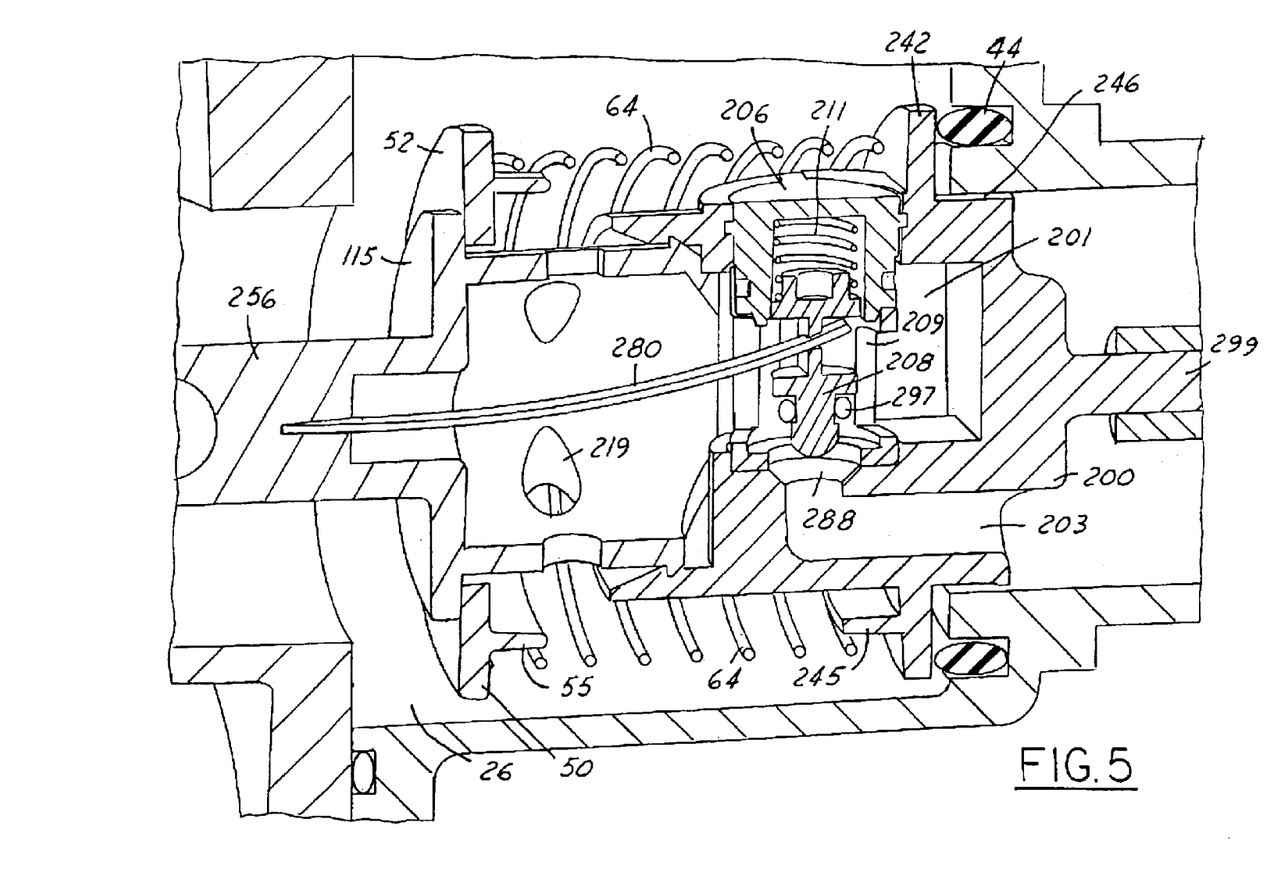
FIG. 5 is a partial cross sectional view of the valve assembly of FIG. 4 in the closed position.
Figure 6:
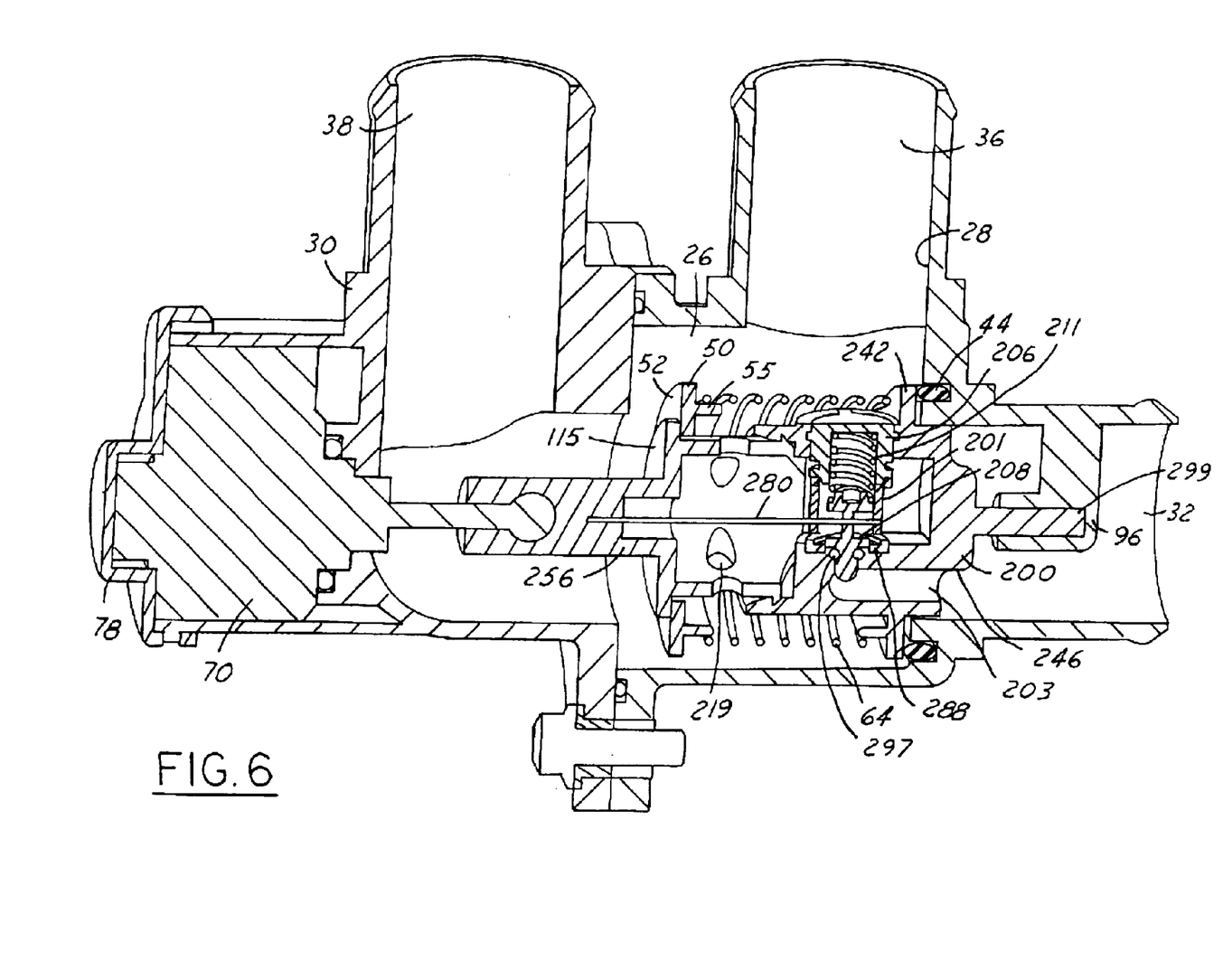
FIG. 6 is a partial cross sectional view of the valve assembly of FIG. 4 in the closed position.

Referring to FIGS. 4 to 6 the main valve 200 of the second embodiment comprises a generally cylindrical body that is slidably received within the chamber 26 for axial movement in and out of abutting engagement with the first end wall 28 of the chamber 26. The main valve 200 includes an annular disc or first ring 242 that extends radially outwardly from the main valve 200 for axially abutting or seating against the first end wall 28. When the first ring 242 is seated against the first end wall 28, fluid flow between the radiator port 32 and the chamber 26 is prevented. An O-ring gasket 44 is mounted to the first end wall 28 for creating a seal between the first end wall 28 and the first ring 242. As with the first embodiment, the main valve 200 also includes a generally conical first guide 246 extending from the first ring 242 that is concentrically engagable with the bore 34 in the first end wall 28 for properly locating the first ring 242 against the first end wall 28 during axial movement of the main valve 200 towards and away from the first end wall 28. There is also a second extension 299 that engages a central locator 96 similarly to the failsafe wax motor 90 of the first embodiment to maintain the location of the main valve 200. The main valve 200 also includes a first shoulder 245 extending longitudinally from the first ring 242 towards the second end wall 30. The first shoulder 245 mates with a spring 64, as described with reference to the first embodiment.

The main valve 200 includes a hollow central cavity 201 for receiving a fail safe mechanism 202. A slot 204 is formed through the main valve 200 into the hollow cavity 201 for receiving the failsafe mechanism 202. A passage 203 is formed through the main valve from the front of the first ring 242 into the central cavity 201. The passage 203 allows fluid to flow through the main valve 200 when the failsafe mechanism 202 is activated, as will be discussed in more detail below.

The secondary valve 50 of the second embodiment is the same as that of the first embodiment.

The hollow valve body 256 of the second embodiment, includes a radially extending flange 115 that has a diameter that is larger than the central bore 54 of the secondary valve 50 for locating the hollow valve body 56 relative to the second valve 50. The hollow valve body 256 includes an integrally formed shaft 258 that mates with the linear actuator 70. Extending in the other direction, the hollow valve body 256 includes a hollow cylindrical member 298 that has slots 219 formed therethrough to allow for the flow of coolant when the failsafe is activated. Disposed within the hollow valve body 256 is a bimetallic strip 280 retained at a first end 281 by the hollow valve body 256 at a position corresponding to the integral shaft 258 and at a second end of the strip 280 by the failsafe plunger 208, as will be discussed in more detail below.

The hollow valve body 256 is coupled to the main valve 200 by a snap fit connection, as previously described with reference to the first embodiment. A helical-type spring biasing member 64 is seated along the first shoulder 245 of main valve 200 and the second shoulder 55 of the secondary valve 50 for axially biasing apart the main and secondary valves 200, 50, such that they move as a unit under normal operating conditions.

The fail safe mechanism 202 comprises a failsafe cover 206 disposed in the slot 204 formed in the main valve 200. The cover 206 comprises a hollow cylindrical body that receives a failsafe plunger 208, retainer 209 and spring 211. The spring 211 is placed in the failsafe cover 206 biasing against a bottom surface 207 of the failsafe cover 206. The spring 211 engages the failsafe plunger 208 at its second end biasing the plunger 208 against a seat 288 formed at the passage 203 entering the central cavity 201. The plunger 208 is disposed within the retainer 209 to maintain its position in relation to the seat 288. The plunger 208 includes an o-ring gasket 297 to seal against the seat 288 when in the closed position.

As with the previously described first embodiment, the failsafe mechanism 202 is activated when the central control or linear actuator 70 fail to respond. The bimetallic strip 280 has metals of differing conductivity, such that as it is heated the bimetallic strip 280 flexes thereby applying a force to the plunger 208 that is attached to the second end of the strip 280, as detailed above. The force applied by the flexing strip raises the plunger from its seat 288 against the biasing force of the spring 211 allowing fluid to enter the central cavity 201 via the passage 203. The fluid then escapes through the slots 219 in the hollow valve body 256, such that it may flow from the radiator and through the radiator port 32.

The invention has been described in an illustrative manner, and it is to be understood that the terminology, which has been used, is intended to be in the nature of words of description rather than of limitation.

Many modification and variations of the present invention are possible in light of the above teachings. It is, therefore, to be understood that within the scope of the appended claims, the invention may be practiced other than as specifically described.

What is claimed is:

1. A valve for controlling the flow of coolant between an engine and a radiator in an automotive vehicle, the valve comprising:

a housing having a chamber formed therein extending between opposing first and second ends;

a radiator port extending between the radiator and the first end of the chamber for passing coolant flowing between the radiator and the chamber;

a bypass port extending between an outlet from the engine and the chamber for passing coolant flowing between the engine and the chamber;

an engine port extending between an inlet from the engine and the chamber for passing coolant flowing from one or both of the radiator and bypass ports between the inlet of the engine and the chamber;

a main valve slidably received within the housing for movement in and out of engagement with the first end of the chamber for closing or opening fluid flow between the radiator and the chamber, the main valve comprising a cylindrical body including a first ring radially extending from the cylindrical body for engaging the first end of the chamber and a conical first guide positioned on an end of the cylindrical body corresponding to a position of the first end, wherein the first guide concentrically engages a bore for locating the main valve within the chamber;

a secondary valve slidably received within the housing for movement with the main valve in and out of engagement with the second end of the chamber for opening or closing fluid flow between the bypass port and the chamber; and a linear actuator operatively coupled between the secondary valve and a central control for automatically and proportionally opening and closing the main and secondary valves in response to changes in the temperature of the coolant within a predetermined temperature range.

2. The valve of claim 1 including a first shoulder extending longitudinally from the first ring in a direction of the second end of the chamber for receiving a spring biasing member.

3. The valve of claim 1 further including a failsafe cover comprising a hollow cylindrical member terminating at a flange at an end corresponding to the first end of the main valve.

4. The valve of claim 3 wherein the failsafe cover attaches to the main valve using a snap fit formed on the main valve that engages the flange of the failsafe cover.

5. The valve of claim 2 wherein the secondary valve comprises a cylindrical member having a second ring extending axially from the cylindrical member and a second shoulder extending longitudinally from the second ring in a direction of the first end of the chamber for receiving a spring biasing member.

6. The valve of claim 5 wherein the secondary valve includes a central bore for receiving a hollow valve body.

7. The valve of claim 6 wherein the hollow valve body comprises a cylindrical member having a radially extending flange having a diameter larger than the bore of the secondary valve for locating the hollow valve body.

8. The valve of claim 7 wherein the hollow valve body is connected to the failsafe cover.

9. The valve of claim 8 wherein a spring is disposed within the hollow valve body for engaging a failsafe wax motor.

10. The valve of claim 5 wherein the biasing spring member is seated along the first shoulder at a first end and along the second shoulder at a second end for biasing apart the main and secondary valves.

11. A valve for controlling the flow of coolant between an engine and a radiator in an automotive vehicle, the valve comprising:

a housing having a chamber formed therein extending between opposing first and second ends;

a radiator port extending between the radiator and the first end of the chamber for passing coolant flowing between the radiator and the chamber;

a bypass port extending between an outlet from the engine and the chamber for passing coolant flowing between the engine and the chamber;

an engine port extending between an inlet from the engine and the chamber for passing coolant flowing from one or both of the radiator and bypass ports between the inlet of the engine and the chamber;

a main valve slidably received within the housing for movement in and out of engagement with the first end of the chamber for closing or opening fluid flow between the radiator and the chamber;

a secondary valve slidably received within the housing for movement with the main valve in and out of engagement with the second end of the chamber for opening or closing fluid flow between the bypass port and the chamber;

a linear actuator operatively coupled between the secondary valve and a central control for automatically and proportionally opening and closing the main and secondary valves in response to changes in the temperature of the coolant within a predetermined temperature range; and a failsafe wax motor disposed between the radiator port and the main valve for providing a failsafe mechanism, wherein the failsafe wax motor is secured within a central cavity of the main valve at a first end of the failsafe wax motor and engages a locator port formed in the radiator port at the other end of the failsafe wax motor.

12. A valve for controlling the flow of coolant between an engine and a radiator in an automotive vehicle, the valve comprising:

a housing having a chamber formed therein extending between opposing first and second ends;

a radiator port extending between the radiator and the first end of the chamber for passing coolant flowing between the radiator and the chamber;

a bypass port extending between an outlet from the engine and the chamber for passing coolant flowing between the engine and the chamber;

an engine port extending between an inlet from the engine and the chamber for passing coolant flowing from one or both of the radiator and bypass ports between the inlet of the engine and the chamber;

a main valve slidably received within the housing for movement in and out of engagement with the first end of the chamber for closing or opening fluid flow between the radiator and the chamber, the main valve comprising a hollow cylindrical body having a central cavity for receiving a failsafe mechanism and wherein a first ring extends radially from the cylindrical body for engaging the first end of the chamber;

a secondary valve slidably received within the housing for movement with the main valve in and out of engagement with the second end of the chamber for opening or closing fluid flow between the bypass sort and the chamber; and a linear actuator operatively coupled between the secondary valve and a central control for automatically and proportionally opening and closing the main and secondary valves in response to changes in the temperature of the coolant within a predetermined temperature range.

13. The valve of claim 12 wherein the main valve further includes a slot formed therethrough into the central cavity for receiving the failsafe mechanism.

14. The valve of claim 12 further including a passage formed through the main valve into the central cavity from a front of the first ring for allowing fluid to flow through the main valve when the failsafe mechanism is activated.

15. The valve of claim 13 wherein the failsafe mechanism comprises a failsafe cover disposed in the slot formed in the main vale and a spring disposed within the failsafe cover and bearing against the failsafe cover at a fist end of the spring and a plunger disposed within the failsafe cover and engaging the spring at a second end for biasing the plunger against a seat formed at an opening corresponding to the passage formed in the main valve.

16. The valve of claim 15 further including a retainer positioned around the plunger for maintaining a location of the plunger relative to the seat.

17. The valve of claim 15 further including a hollow valve body having a radially extending flange for mating with the secondary valve.

18. The valve of claim 17 wherein the hollow valve body comprises an integrally formed shaft extending longitudinally from the radially extending flange on a first side of the flange and a cylindrical member extending longitudinally from the other side of the flange.

19. The valve of claim 18 wherein the cylindrical member includes slots formed therein for allowing fluid flow when a failsafe is activated.

20. The valve of claim 17 wherein the hollow valve is connected to the main valve.

21. The valve of claim 18 wherein a bimetallic strip is disposed within the central cavity of the main valve and the hollow valve body, the bimetallic strip attached to the hollow valve body at a fist end of the strip and at a second end of the strip by the plunger.

22. The valve of claim 21 wherein the bimetallic strip flexes in response to a temperature change when the linear actuator does not respond whereby a force is applied to the plunger lifting it from the seat allowing fluid to enter the main valve and exit through the slots formed in the hollow valve body.

23. A valve controlling the flow of coolant between an engine and a radiator in an automotive vehicle, the valve comprising:

a housing having a chamber formed therein extending between opposing first and second ends;

a radiator port extending between the radiator and the first end of the chamber for passing coolant flowing between the radiator and the chamber;

a bypass port extending between an outlet from the engine and the chamber for passing coolant flowing between the engine and the chamber;

an engine port extending between an inlet from the engine and the chamber for passing coolant flowing from one or both of the radiator and bypass ports between the inlet of the engine and the chamber;

a main valve slidably received within the housing for movement in and out of engagement with the first end of the chamber for closing or opening fluid flow between the radiator and the chamber;

a secondary valve slidably received within the housing for movement with the main valve in and out of engagement with the second end of the chamber for opening or closing fluid flow between the bypass port and the chamber;

a linear actuator operatively coupled between the secondary valve and a central control for automatically and proportionally opening and closing the main and secondary valves in response to changes in the temperature of the coolant within a predetermined temperature range; and a gasket secured to the first end wall and facing towards the second end wall for engaging the main valve and avoiding direct fluid flow between the radiator and engine ports.

* * * * *

UNITED STATES PATENT AND TRADEMARK OFFICE
CERTIFICATE OF CORRECTION

PATENT NO. : 6,863,221 B2
DATED : March 8, 2005
INVENTOR(S) : Colas et al.

It is certified that error appears in the above-identified patent and that said Letters Patent is hereby corrected as shown below:

Column 3,
Line 49, delete "be".

Column 5,
Line 8, delete "be".

Column 9,
Lines 17 and 40, delete "fist", insert -- first --.

Signed and Sealed this

Twenty-fourth Day of May, 2005

JON W. DUDAS
*Director of the United States Patent and Trademark Office*